(12) United States Patent
Carrera

(10) Patent No.: US 6,284,529 B1
(45) Date of Patent: Sep. 4, 2001

(54) BIOLOGICAL WASTE TREATMENT PLANT

(75) Inventor: Pietro Carrera, deceased, late of Rome (IT), by Alberto Carrera, legal representative

(73) Assignee: SCT Sorain Cecchini Tecno S.R.L., Rome (IT)

( * ) Notice: Subject to any disclaimer, the term of this patent is extended or adjusted under 35 U.S.C. 154(b) by 0 days.

(21) Appl. No.: 09/284,012
(22) PCT Filed: Oct. 3, 1997
(86) PCT No.: PCT/IT97/00238
§ 371 Date: Jun. 8, 1999
§ 102(e) Date: Jun. 8, 1999
(87) PCT Pub. No.: WO98/15507
PCT Pub. Date: Apr. 16, 1998

(30) Foreign Application Priority Data

Oct. 7, 1996 (IT) ............................................. RM96A0678

(51) Int. Cl.[7] .................................................. C12M 1/00
(52) U.S. Cl. ...................................... 435/290.4; 435/290.2
(58) Field of Search ............................. 435/290.2, 290.4, 435/286.2

(56) References Cited

FOREIGN PATENT DOCUMENTS

| 43 15 323 A | * 11/1994 | (DE) . |
| 2 391 164 A | * 12/1978 | (FR) . |
| 1 066 158 | * 10/1965 | (GB) . |
| WO 93/16017 A | * 8/1993 | (WO) . |

* cited by examiner

Primary Examiner—David A. Redding
(74) Attorney, Agent, or Firm—Breiner & Breiner

(57) ABSTRACT

A plant for the biological treatment of solid organic waste, where the organic mass is fed into a treatment tank with a horizontal bottom, while screw propellers, suspended from a sliding bridge parallel to tank base, operate immersed in the matter and whose axis is inclined according to a convenient angle, preferably between 5° and 50°, compared to its vertical, moving the organic matter from the bottom upwards and from the inflowing side of the treatment tank to the outflowing one, continuously immersed in a direction which is at right angles compared to the direction of movement of the organic mass and remaining continuously active, that is without any idle return of the screw propellers across the treatment tank after each process cycle.

10 Claims, 7 Drawing Sheets

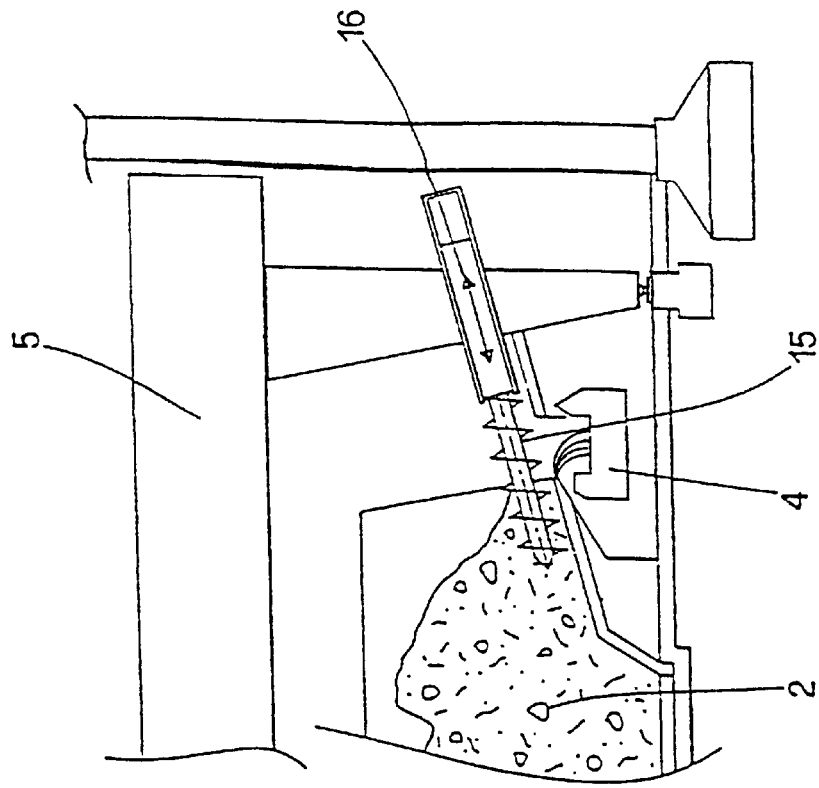
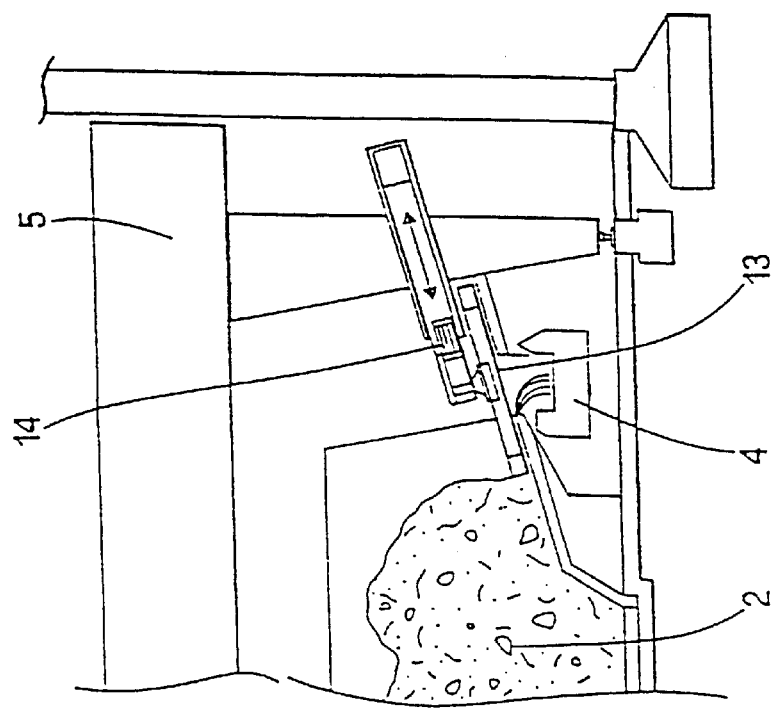
FIG.5

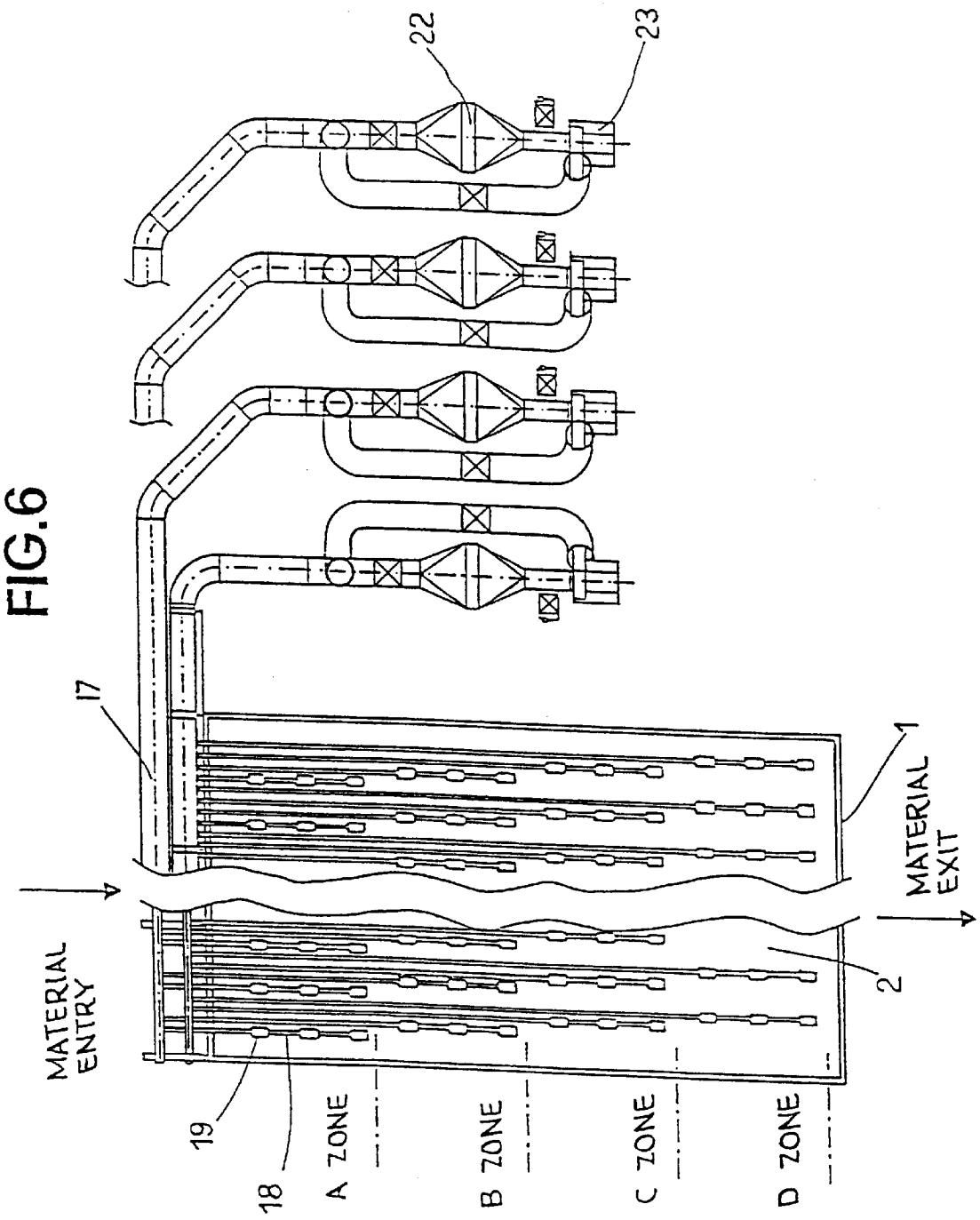

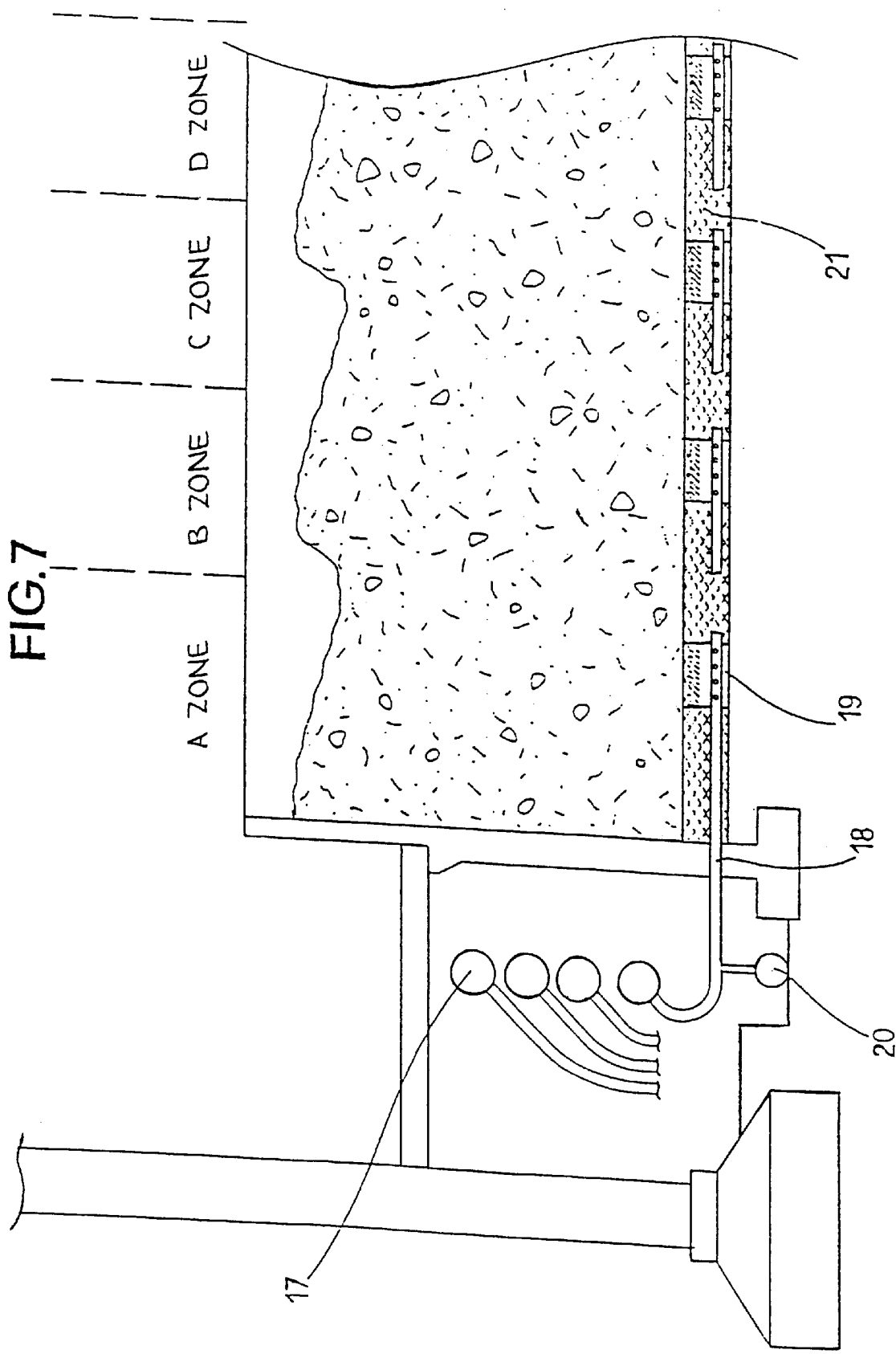

BIOLOGICAL WASTE TREATMENT PLANT

TECHNICAL FIELD

The present invention relates to a biological waste treatment plant.

BACKGROUND OF THE INVENTION

An enormous amount of organic waste is produced daily, by the human food chain, in agriculture and by the agro-industrial sector. This organic waste accounts for a large part of solid urban waste, it is one of the main components of sewage and constitutes the residue of the agro-industry and other industries.

The problem is how to treat this waste, so as to prevent its entering the sewerage, and to reutilize it.

Aerobic decomposition by means of micro-organism (composting) is undoubtedly a very efficient and economic technique. The biological treatment plants currently known generally operate by feeding the organic matter, either continuously or discontinuously, into treatment tanks of various shapes, where it is stirred by mechanical means, so as to achieve a state of homogenization, and moved forward, so as to make room for the inflowing waste matter; furthermore, the treated matter is kept well aerated, so as to ensure that the micro-organism which perform the biological process, are kept well supplied with the necessary amount of oxygen.

Various waste treatment plants are known which operate according to the above mentioned technique, however, they all feature drawbacks which limit their efficiency. For instance, Swedish patent 7306001-4, deposited on Apr. 27, 1974 by Johnson Construction Company AB, provides for a treatment tank with a sloping base, above which are suspended one or more sets of screw propellers, pivoted around a horizontal axis attached to a roller bridge, which are dipped inside the mass and move across the entire length of the treatment tank, from the inflow will to the outflow wall, thus mixing and pushing the mass forward to make space for new waste matter. When the screw propellers reach the outflow wall they are turned around their hinges, pulled out of the mass and then moved back to the inflow wall, where they are once again dipped into the mass and begin a new cycle. The air for the micro-organisms performing the biological process is pumped through the screw propellers themselves, which are hollow inside. This kind of system features various serious drawbacks, such as a loss of about 50% of the working time for the idle return of the screw propellers across the treatment tank after each process cycle, the non-uniform progress of the mass from the inflow side of the treatment tank to the outflow, due to the necessary extraction and re-immersion of the screw propellers inside the mass, and the prerequisite of a treatment tank with a heavily sloping base, to help the mass in its progress, since otherwise it would exercise too strong a resistance against the screw propellers, jeopardising the correct operation of the system's mechanical parts. This loss of time translates into a reduction of the treating capacity, while the non-uniform progress of the mass, as well as the variation, in the order of 50%, of the time required by the waste matter to achieve a sufficient degree of maturation, may completely alter the outcome, which is measured as the degree of maturation and is closely linked to the time spent in the treatment tank by the totality of particles composing the mass, and other parameters, such as mixing and aeration.

Italian patent 23342 of Oct. 18, 1983, deposited by Secit SpA, provides for a technique similar to the one described in the Swedish patent, whereby the screw propellers advance in the same direction as the mass, while in this case the screw propellers are removed from the mass by means of translation along their axis, perpendicularly to the base of the tank, and the aeration of the mass takes place through protected pipes laid on the bottom of the treatment tank.

With the exception of the non-uniform advance of the mass, which defect is remedied by the extraction and re-immersion of the screw propellers, which translate along their axes, no remedy is found for the other drawbacks of the Swedish patent, on the contrary, to these one must add the further disadvantage of having to provide for a building large enough to house the entire plant, which is quite tall, so as to enable the lifting of the screw propellers.

Since all plants of this kind must be adequately sealed from the outside, for obvious reasons of environmental impact, a higher building, besides entailing higher construction costs, also requires higher operating costs, due to the larger amounts of air to be circulated within the building and then deodorized, since the number of change of air per hour must remain equal.

Italian patent of Aug. 7, 1987 in the name of Sorain Cecchini SpA describes a technique whereby the organic matter is contained inside a preferably sloped treatment tank and one or more sets of slanted screw propellers, suspended from a sliding bridge parallel to the tank base, stir and move the mass, not by pushing it but by pulling it toward the outflow, in order to reduce the stress exercised by the mass on the screw propellers.

In this case, the screw propellers move in an opposite direction compared to the mass, but this plant too features the drawback of their idle return run, as well as the over-turning of the screw propellers at the end of the cycle and their re-immersion into the mass, thus featuring the same drawbacks as the previous invention.

DISCLOSURE OF INVENTION

The present invention relates to a biological waste treatment plant aimed to remedy the drawbacks affecting the above mentioned inventions and to allow economies, with regard to both the initial investment and operating costs.

The main objects of the present invention are:

- to eliminate of the dead time due to the idle return of the screw propellers;
- to use horizontal treatment tanks and industrial pavings, without having to incorporate any channels of pipes;
- to guarantee a regular and uniform progress of the treated mass, thanks to the use of a simple and easily adjustable system;
- to ensure the continuous and proportioned outflow of the mass from the tank, without the need of any effluent clearing pockets;
- to guarantee the self-cleaning of the screw propellers, with the continuous elimination, while operating, of the threads and rags which inevitably get wrapped round the screws;
- to maintain a constant height of the mass in the tank, so as to compensate the reduction of volume due to evaporation and to other chemical processes, by adopting simple measures;
- to continuously remove the dense and hardened layers of matter, which may accumulate on the bottom of the tank, if they are not stirred by the screw propellers for a long time;
- to ensure the forced aeration of the organic mass, so as to minimize condensation inside the building housing the biological treatment tank;

to recover the heat produced by the biological processing cycle and use it to heat the ventilated air circulating inside the building, in the colder and damper season, thus reducing humidity, with considerable benefits from the point of view of the enviromental impact.

The present invention is based on the principle that the waste matter to be treated is stirred and moved exactly as if it were done manually, thus creating a close succession of heaps, by means of mechanical tools such as screw propellers.

According to the present invention, the treatment tank is a horizontal rectangular tank into which the organic solid waste is fed, either continuously or discontinuously, along one of the longer walls, by means of conveyor belts or any other mechanical means, the processed matter outflowing on the opposite side.

According to the preferred embodiment of this invention, above the tank there is a bridge with a trolley to which two screw propellers are attached, in a slightly slanted position, with the tips pointing towards the inflowing side. The screw propellers are lowered into the mass near the inflowing side of the treatment tank and are then moved longitudinally across the entire length of the tank by the bridge. Due to their inclination, the screw propellers plough through the mass forming longitudinal furrows and expelling from the treatment tank a volume of waste matter equal to the volume of the furrow.

According to this technique, the waste matter is cut longitudinally, thus separating a first heap, which then flows out over the tank wall. After this first furrow has been made and reached the treatment tank wall, the set of screw propellers remains inside the waste matter and moves along the bridge to the inflowing wall, where it starts ploughing a new furrow, thus making another heap, and so on, through a succession of furrows, until it reaches the inflowing of the tank, where the screw propellers engage the fresh organic matter and create the empty space for the inflowing waste matter. At this point the set of screw propellers, having completed the cycle, usually at the end of the day, returns to the starting point, where it remains immersed inside the matter, although it is possible to remove it, if necessary, since it is attached to the bridge by means of a hinge.

The succession of heaps ensures the regular advance of the waste matter at each passing of the screw propellers; at the same time the heaps are very close the one to the other, separated only by a superficial furrow, thus achieving a high degree of optimization of the treatment tank volume.

By gauging the pitch of the furrows, by means of a computer and relative programme, it is possible to maintain the mass at a constant level, since it would otherwise diminish, due to the effects of evaporation and other chemical reactions, while the slanting of the screw propellers ensure the advance of the mass at the desired speed, thus making sure that it remains inside the treatment tank for a suitable period of time.

By means of the computer and suitable programme, and of the slanted screw propellers, it is possible to ensure the cyclic,thus furrowing of the entire mass, right down to the lowest layers preventing the matter from stagnating, since after a while it would become hard and impermeable to air.

According to the present invention, blades are attached to the upper part of the screw propeller stems so that, by the contrast with other fixed blades it is possible to cut any threads and rags contained in the mass and which may wrap around the revolving parts, eventually reaching the upper part of the screw propellers, thus avoiding any laborious manual cleaning operations, which would require the stopping of the plant.

Furthermore, since the set of screw propellers, when forming the first furrow, would determine the outflow from tank of the entire equivalent of a daily cycle, in a relatively short period of time, thus requiring a large pocket to receive it before the subsequent treatments, according to the present invention, the outflowing side of the tank is provided with a platform, along its entire length, where on the waste matter is temporarily held while an extractor-batcher on the edge of the bridge gradually removes and batches the treated waste matter throughout the forward and backward movement of the bridge, while the furrowing takes place inside the treatment tank. This results in a regular and easily adjustable outflow, capable of directly supplying the following mechanism without the need of any pockets.

Further advantages may be obtained, with regard not only to the biological process, but also to the enviromental impact, by means of a special forced aeration system from the bottom of the treatment tank and the recovery of the heat generated by the biological process, thus enabling the pre-heating of the air for circulation inside the building, as well as the considerable reduction of the quantity of air, with enormous benefits for the subsequent deodorization of the surroundings.

BRIEF DESCRIPTION OF THE DRAWINGS

In order to explain the invention in question more clearly, a more detailed structural and functional description of the preferred embodiment will now be given, with reference to the accompanying drawings, in which:

FIG. 5 shows two embodiments of the extracting device;

FIG. 6 shows the aeration system;

FIG. 7 shows a cross-section of the tank and of the building housing it.

DETAILED DESCRIPTION OF THE PREFERRED EMBODIMENT

Figure 1:
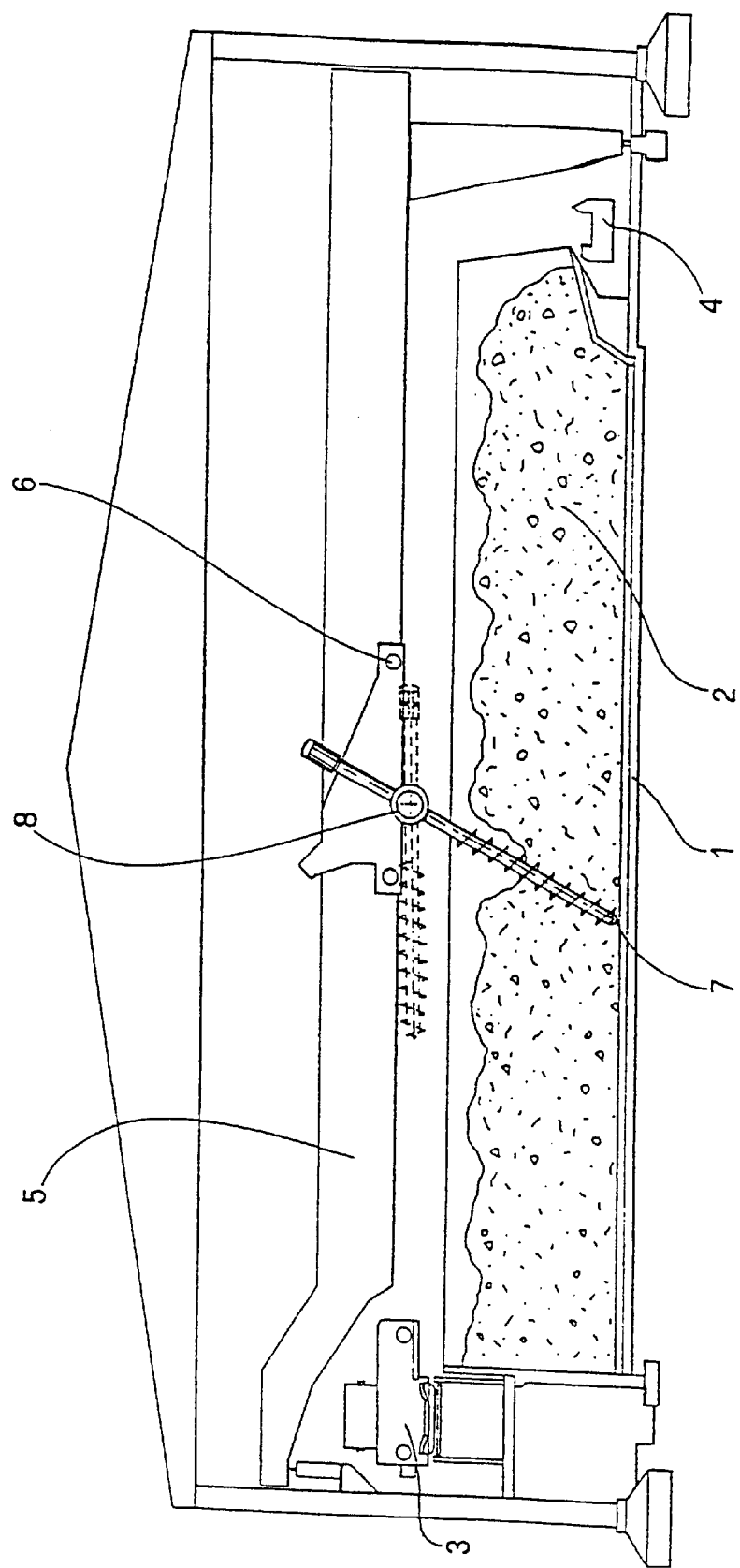
FIG. 1 shows a cross section of the treatment tank.

Referring to the figures, and in particular to FIG. 1, the organic mass (2) is fed into the treatment tank (1), preferably in a continuous manner, by means of a conveyor belt (3), or similar device. Above the tank (1) is a bridge (5) along which runs a trolley (6), to which is attached a set of one or more screw propellers (7), characterized in that they (i) rotate around their own axes and move from one end of the tank (1) to the opposite end, carried by the bridge (5); (ii) move along the bridge (5) across the tank (1), from one end to the opposite end; (iii) may be overturned by rotating around their rotation axis (8), thus enabling their extraction from the organic mass, if necessary.

Figure 2:
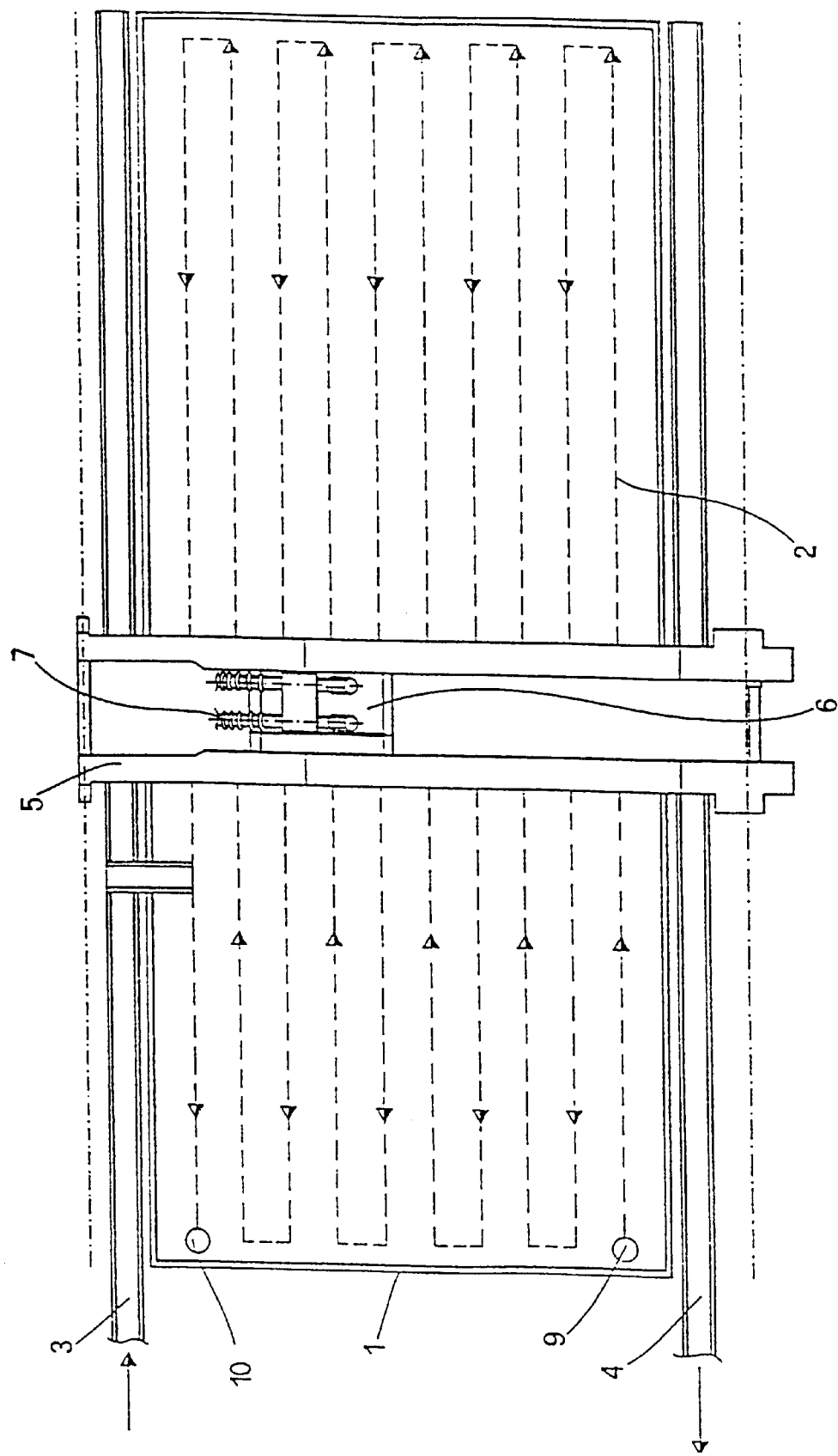
FIG. 2 shows the plan of the tank.

FIG. 2 shows a plan of the tank with the direction of movement of the screw propellers, from the starting point (9) up to the end point (10), according to a fret-like movement, indicated with a dotted line. At the end of the movement from the end point (10) to the starting point (9), the screw propellers are preferably extracted from the organic mass (2) by rotating them around their axis (8), and this operation, as previously mentioned, occurs at the end of the processing cycle, which normally lasts one day, since, according to the preferred embodiment, the organic mass is mixed once a day. The overturning of the screw propellers (7) is useful mainly to enable the bridge (5) to move away from the treatment tank (1), for the purpose of maintenance, or to be moved over another tank.

The preferred embodiment comprises two screw propellers (7), placed alongside one other, longitudinally, one of which traces the furrow while the other one finishes the work. The entire run of the screw propellers is active and their fret-like movement is guided by a computer, whose programme provides for a number of different cycles, which differ for small variations of the fret-like movement, so that the bottom end of the screw propellers trace ever changing furrows, compared to the previous cycle, to make sure that the organic mass is ploughed through its entire height.

Figure 3:
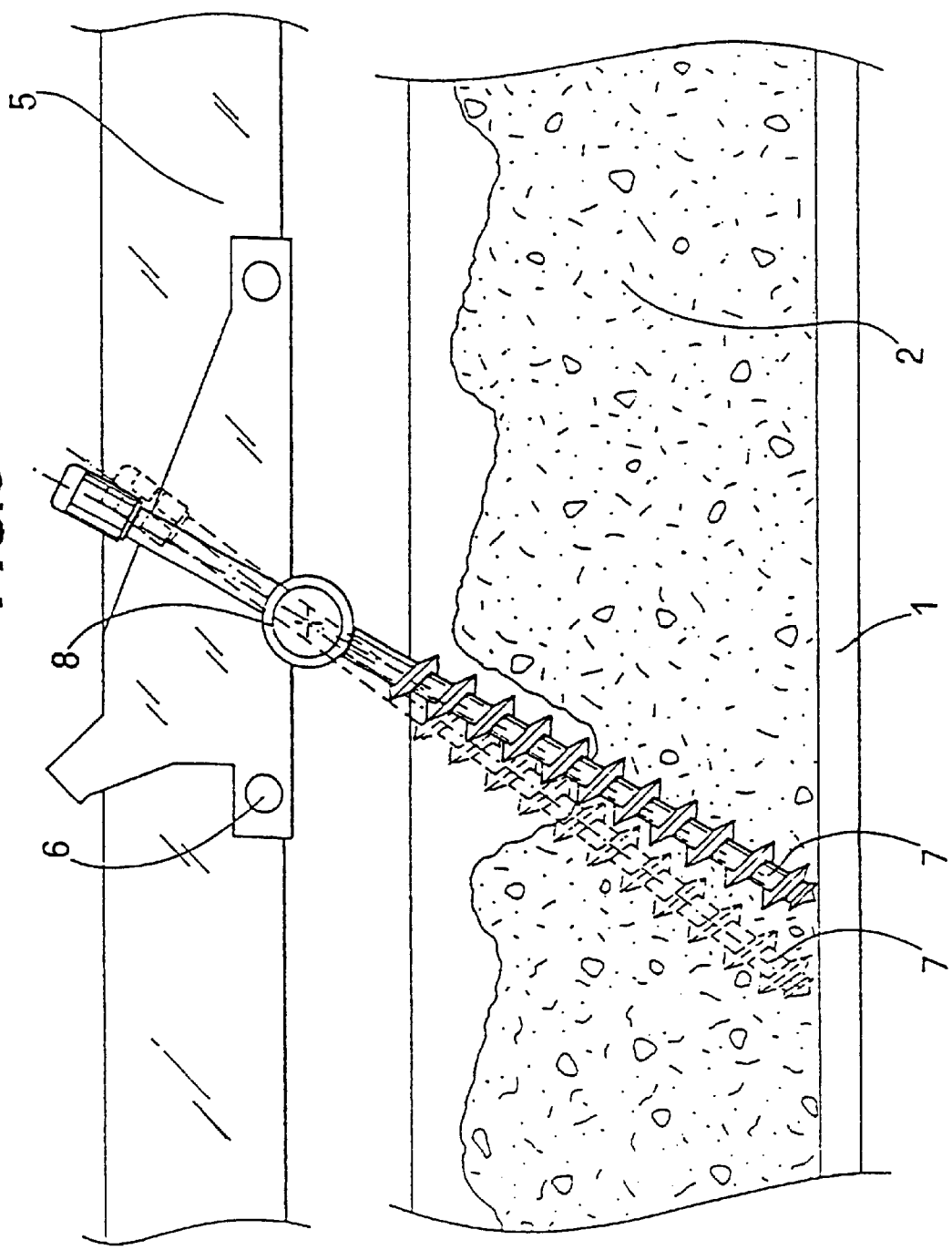
FIG. 3 shows a preferred angle of the screw propellers.

FIG. 3 shows the preferred embodiment with regard to the operating position of the screw propellers (7) which, although they both skim over the bottom of the tank, have a split end section to guarantee a more effective ploughing of the lowest layers of the organic mass.

Figure 4:
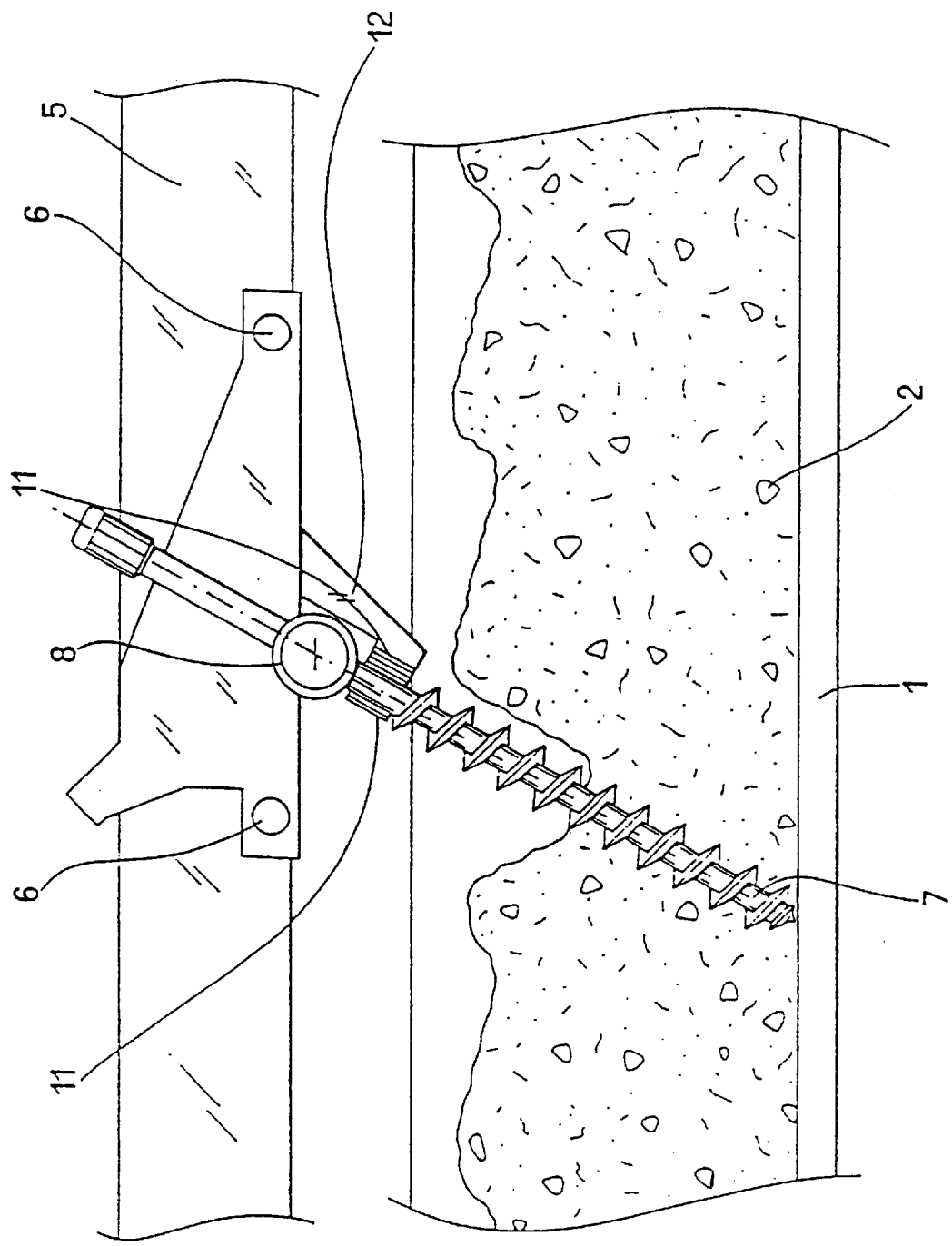
FIG. 4 shows the thread cutting device.

As previously mentioned, the system is also provided with a device for cutting the threads and rags, shown in FIG. 4, which may get wrapped around the screw propellers and which inevitably tend to move upwards.

The blades (11) attached to the stem of the screw propellers cut the threads and rags wrapping around the screw stems during the rotation, and which would otherwise require the machine to be stopped, thanks to the counter-blades attached to the screw trolley (6).

FIG. 5 shows two different embodiments of the organic waste matter extracting and batching device.

The first device comprises a circular mill (13) carried by a telescopic arm (14), while the second comprises a screw feeder (15) supported on a telescopic arm (16).

Both these devices move integral with the bridge (5) and briefly penetrate the organic waste matter to be extacted each time the bridge reaches one end of the tank to change its direction, in this manner, while the screw propellers (7) furrow through the organic mass (2) inside the tank (1), the extraction and batching device completes the outflowing operation, thus ensuring the removal a sufficient amount of the mass such as to make space for the inflowing matter, when the screw propellers run the first leg of a new processing cycle.

It is well known that the organic mass must be adequately aerated, so as to supply oxygen to the micro-organisms performing the biological process.

According to the present invention, the forced aeration system shown in FIG. 6 is achieved by blowing the air into the organic waste matter from the bottom of the tank. To this purpose, the bottom of the tank is symbolically divided, lengthwise, into a certain number of zones (2/6), according to the width of the tank; the zones correspond to various phases of the biological process on transformation of the organic mass, along the entire length of the tank, and requiring different amounts of air for each phase. Each of the zones is served by a specific set of pipes (18), laid on the bottom of the tank and perforated so as to allow the air to pass through.

Item (17) is one of the manifolds, located outside the tank, from which the pipes (18) serving a specific zone of the tank originate. Item (19) indicates the protection covering the perforated section of the pipes (18), to prevent any infiltration by the mass, which could block the pipes. Each manifold is directly connected to a fan (23), capable of blowing or sucking air into or from the bottom of the tank. When the air is sucked, since it is quite warm (40–55°), it is first made to pass through a set of heat exchangers (22), which transfer the heat to the fresh air before this is used for ventilating the building housing the tank.

This arrangement is very important in those areas affected by a cold and humid climate, or in the wet season, since the preliminary heating of the air, by enhancing its water vapour carrying capacity, considerably reduces condensation, while at the same time reducing the amount of air required for ventilating the building. This is an enormous advantage, from the point of view of the environmental impact, because the air which passes through the building is charged with the smell and needs to be deodorized before being expelled into the atmosphere; however, since the deodorizing process cannot be 100% effective, the atmosphere; lesser the amount of air requiring treatment, the lesser its polluting effect.

FIG. 7 shows a cross-section of the treatment tank and of the building housing it, showing the cross-section of the pipes for the forced aeration of the organic mass. It shows the pipes (18) with the perforated sections lying on the bottom of the tank, the protection (19) covering the perforated sections of the pipes, the conduit (20) connected to each pipe (18), for collecting the condensation, and the layer of permeable material (21) placed over both the pipes (18) and the protections (19), to prevent any contact with the organic mass.

The plant for the biological treatment of organic waste matter according to the present invention, has been described and illustrated by way of example only and the preferred embodiment may be modified, according to any practical and technical requirements falling within the inventive scope of the present invention.

What is claimed is:

1. A plant for the biological treatment of solid organic waste, comprising in combination:
    a generally rectangular shaped treatment tank having a horizontal bottom with a narrower width and a longer length and vertically oriented side walls for receiving and treating a body of said organic waste,
    a trolley bridge extending across the width of the tank carrying a trolley movable back and forth along the length of the tank,
    feeding means including a conveying means for feeding said organic waste into a first side of the tank along the length of the tank,
    removal means carried by said trolley bridge for removing treated organic waste along the length of the tank from an opposite side of the tank,
    at least one screw propeller acting as stirring and pushing means carried by said trolley and movable back and forth along the trolley bridge across the width of the tank,
    programmed movement control means for moving the trolley and at least one screw propeller in a controlled movement pattern with the at least one screw propeller immersed in said body of organic waste thereby to plow in entirety the organic waste in the tank, and
    aerating means disposed upon the bottom of the tank for introducing air into the organic waste during movement of the trolley bridge.

2. The plant defined in claim 1 wherein the longitudinal axis of the at least one screw propeller is inclined at an angle of between 10 degrees and 50 degrees from vertical, with tips pointed towards inflowing waste.

3. The plant defined in claim 1 wherein said programmed movement control means is constructed and arranged to move an inflowing mass of the organic waste from an inflowing side of the tank to the outflowing side of the tank over a series of longitudinal zones divided by furrows made by the at least one screw propeller, operable to move said organic waste toward the outflowing side of the tank at a speed requiring each particle of the organic waste to remain inside the tank for a substantially equal time.

4. The plant defined in claim 3 wherein said programmed control means further comprises means for maintaining the at least one screw propeller close to the bottom of the tank to prevent caking of a hardened layer of waste impermeable to the incoming air.

5. The plant defined in claim 3 wherein said programmed movement control means defines a distance between furrows between the inflowing and outflowing sides of the tank compensating for reduction of the organic mass due to evaporation and chemical reactions.

6. The plant defined in claim 1 wherein the removal means further comprises a mechanism for substantially continuously extracting organic waste from the tank, said extracting performed by said removal means being independent from operation of said at least one screw propeller.

7. The plant defined in claim 1 wherein the at least one screw propeller comprises at least one screw propeller disposed along a longitudinal axis slanted from vertical at an angle causing the at least one screw propeller to plough through the waste in two diverse longitudinal directions forming two furrows on the bottom of the tank to facilitate removal of deposits.

8. The plant defined in claim 1 wherein the at least one screw propeller further comprises fixed cutting blades disposed for cutting rags and threads moving along screws of the at least one screw propeller during treatment.

9. The plant defined in claim 1 wherein the aerating means further comprises a pipe pattern laid on the bottom of the tank grouped into zones for supplying the quantities of air required in said controlled movement pattern for the at least one screw propeller.

10. The plant defined in claim 1 wherein the aerating means further comprises perforated pipes and protective means for preventing the entry of the organic waste into aerating pipe perforations.

* * * * *